Aug. 13, 1935.  J. J. CRAWFORD  2,010,979
ADJUSTABLE CULTIVATING AND FURROWING SHOE
Filed May 9, 1934  2 Sheets-Sheet 1
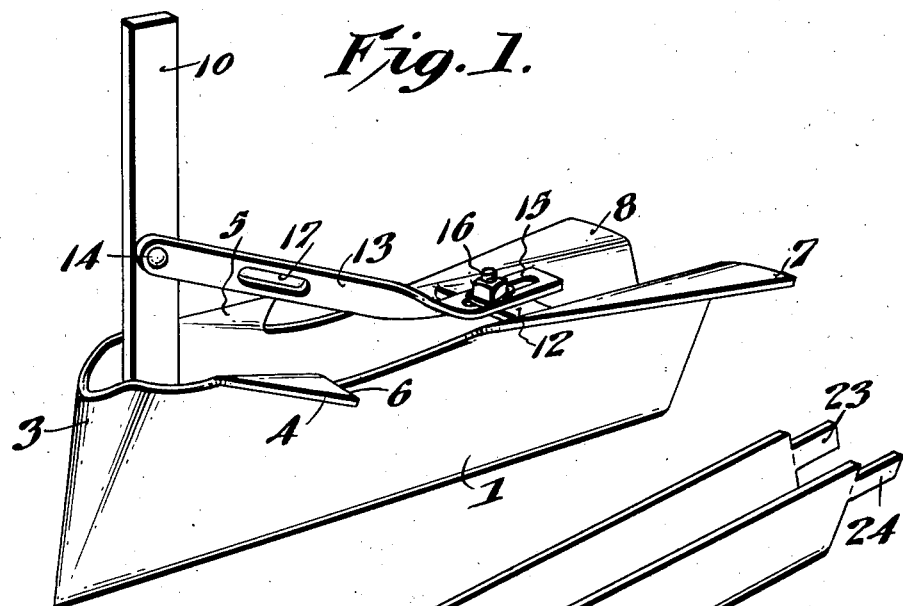
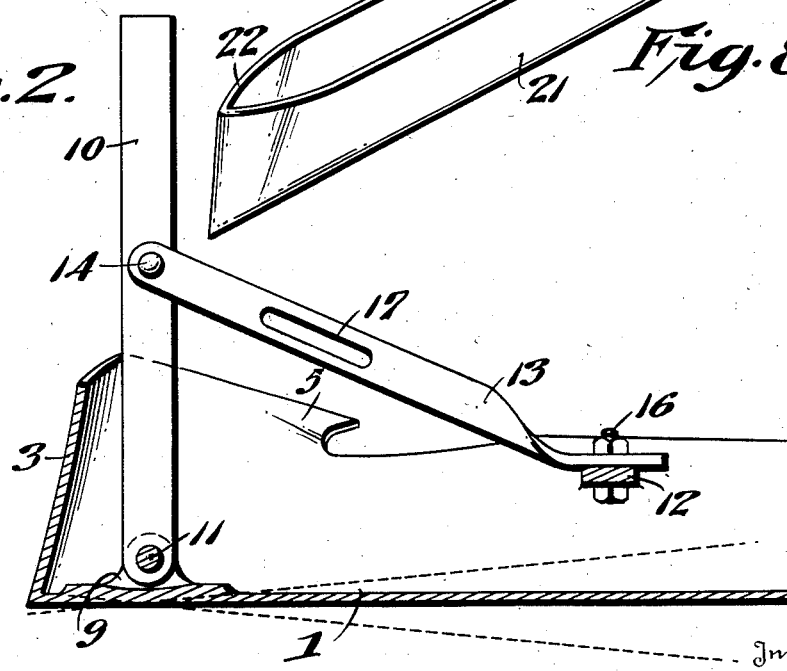
Inventor
John J. Crawford Aug. 13, 1935.   J. J. CRAWFORD   2,010,979
ADJUSTABLE CULTIVATING AND FURROWING SHOE
Filed May 9, 1934   2 Sheets—Sheet 2
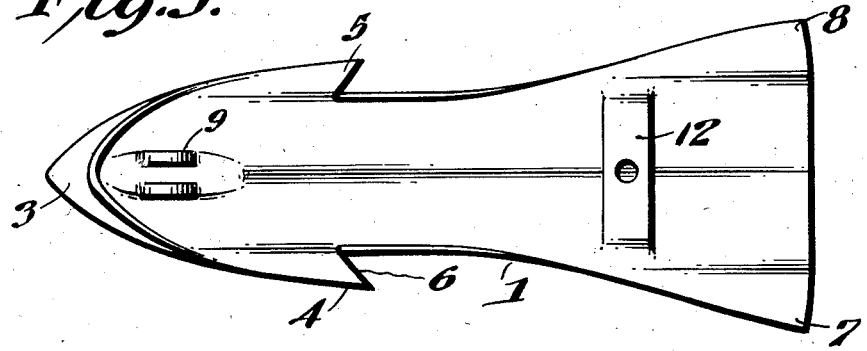
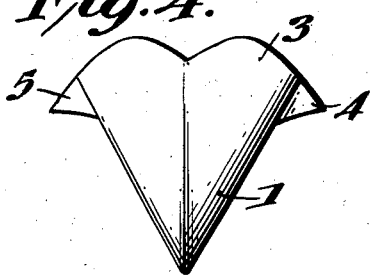
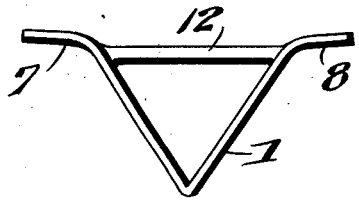
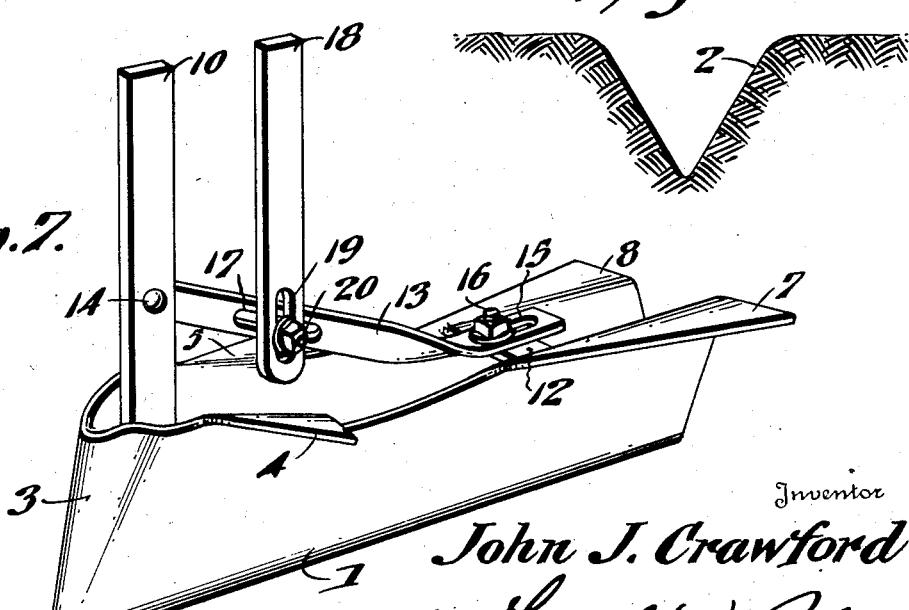
Inventor
John J. Crawford
By Lloyd W. Patch
Attorney Patented Aug. 13, 1935

2,010,979

UNITED STATES PATENT OFFICE 2,010,979

ADJUSTABLE CULTIVATING AND FURROWING SHOE

John J. Crawford, Pueblo, Colo.

Application May 9, 1934, Serial No. 724,778

7 Claims. (Cl. 97—225)

My invention relates to improvements in adjustable cultivating and furrowing shoes, and particularly to a device of this character intended and adapted to be attached to a beet, bean, or other crop cultivator, which tool or shoe will perform the double operation of cultivating or working the ground and of furrowing to form an irrigation ditch.

An object of this invention is to provide a tool of this character which is readily and fully adjustable to be set to cultivate and furrow to any depth desired, and which adjustment can be made readily while in the field to adapt the device for the particular conditions of use, and for the particular soil being worked.

Yet another object is to so construct the shoe that the earth is pressed outwardly and packed down to form the irrigation ditch, portions of the shoe serving to press down and pack or trowel the ditch with more or less pressure and to prevent the formation and leaving of loose earth along the sides of the irrigation ditch.

Still another object is to provide a device of this character that is simple and inexpensive in construction and manufacture, and which can be used with substantially all types and makes of cultivators and the like.

With the above and other objects in view, which will be apparent to those skilled in the art, my invention includes certain novel features of construction and combinations of parts which will be hereinafter set forth in connection with the drawings and then pointed out in the claims.

In the drawings:

Figure 1 is a view in perspective showing a cultivating and furrowing tool constructed in accordance with my invention.

Fig. 2 is a longitudinal vertical sectional view through the parts as illustrated in Figure 1.

Fig. 3 is a top plan view to better show the form and construction of the shoe.

Fig. 4 is a view in elevation showing the front end of the shoe.

Fig. 5 is an end view in rear elevation.

Fig. 6 is a cross section view through the soil surface to show the furrow impression.

Fig. 7 is a view similar to Figure 1 showing a modified construction.

Fig. 8 is a view in perspective showing a wearing shoe that may be used.

My present tool is intended and adapted to be used in connection with a beet, bean or other crop cultivator, or similar agrictultural implement, and is to be attached in place of and in substitution for one or more of the usual cultivating shoes or other earth working tools, and as the manner of attaching earth working tools to agricultural implements is old and well known in the art, no attempt is here made to show any of the multitudinous forms of cultivators, agricultural implements or other machines to which the present invention might be applied for use.

The shoe, generally indicated at 1, is made up of sheet metal or any other material and is constructed to be substantially V-shaped in cross section, as perhaps best shown in Figs. 4 and 5, and this V-shaped body portion is made to be of considerable length and has the side walls thereof so inclined that a ditch formed thereby, which ditch is generally indicated at 2 in Fig. 6, will have its sides inclined to be self-supporting and to prevent caving in or ready washing out of the side portions.

At its forward end the body 1 is closed, as at 3, and this closed end is made somewhat blunt or rounded and slightly sloping so that as the tool is passed through the ground the soil will be pressed outwardly, rather than rolled up or thrown out in ridges at each side of the furrow or ditch as formed by the forward travel of the shoe. This forward end 3 is made relatively higher than the desired depth of the ditch, and smoothing fins 4 and 5 are provided laterally toward the forward end of the shoe. These smoothing fins are inclined downwardly rearwardly, and are somewhat flared from the body of the shoe toward their straight trailing edges 6. With this formation, any dirt that may be raised or thrown or pushed out along the sides of the furrow forming the ditch will be spread and smoothed. Toward the rear end of the shoe 1 packing fins 7 and 8 are provided, these fins being preferably made wide at their trailing ends and sloped or inclined gradually downwardly from the body portion of the shoe 1.

With the shoe constructed as set forth, the movement of the implement forward through the soil will cause the earth to be pressed outwardly by the advancing movement of the forward end 3, and any dirt accumulating or rolling up on either side of the shoe will be spread by the fins 4 and 5. Due to the fact that the forward end of the shoe pushes or forces the dirt back to each side, the inclined side walls of the furrow or ditch 2, as shown in Fig. 6, will be packed, the greatest packing force being exerted possibly near the upper sides of the ditch. The fins 4 and 5 spread any loose dirt to be evenly distributed, and as the fins 7 and 8 move forward they will pack down the surface on each side, laterally of the ditch 2, as illustrated in Fig. 6.

Toward the forward end of the shoe 1, and near the bottom of the V-shaped form thereof, a bearing 9 is provided, and this bearing has a bifurcated bearing portion in which the lower end of tool supporting post 10 is mounted to be capable of limited swinging movement, by means of pin or bolt 11. A cross bar 12 is mounted between the sides of the V-shaped body of the shoe 1 toward the rear end thereof, and the side walls are thus reinforced and braced against being bent or displaced due to the force exerted in packing the earth. A brace link 13 is pivotally connected on the mounting post 10 at one of its ends, by pin, rivet or bolt 14, and this brace link has an elongated slotted opening 15 in its free end. An adjusting clamp bolt 16 is fitted through this slotted opening 15 and through an opening formed centrally in cross bar 12, and thus the brace link 13 can be adjustably clamped in place to dispose the shoe 1 at different angles, with its lower edge inclined either upwardly or downwardly from a horizontal line as indicated by the dotted lines in Fig. 2. With some types and forms of cultivators or other implements, the tool mounting bar may require disposition of the post 10 to incline either forwardly or rearwardly, and this adjustment through bolt 16 will permit compensation for any inclination of the mounting post 10.

As set forth above, the furrow opening is formed into a ditch 2, of substantially the shape shown in Fig. 6, with the dirt in the side walls and at the adjacent edge of the ditch tightly packed to thus prevent caving or erosion from ordinary use, and to leave the top edge substantially in a plane with the surface of the field so that the water can properly flow.

With some types and constructions of cultivators or other implements, two mounting bars are provided for better attachment and securement of the shoes or tools, and in Fig. 7 I have shown an adaptation particularly suited for such mountings. The bar 13 has an elongated slot 17 formed in its middle portion and a second mounting post 18 is provided with elongated slot openings 19 adapted to register with the opening 17, the two openings having clamp bolt 20 passed therethrough. The second mounting post 18 is thus securely attached to the bar 13 adjacent to the mounting post 10 and is adjustable forwardly and rearwardly, vertically and angularly, to thus be disposed in any desired setting required by the particular mounting or bar arrangement of the implement.

As illustrated in Fig. 8, a removable and renewable wearing shoe 21, can be provided to fit over and be held upon the lower portion of the elongated body which is subjected to the greatest wear while the ditching shoe is in use. This wearing shoe is shaped at its forward end 22 to substantially fit and hold upon the furrow opening forward end of the elongated body 1, and bendable lugs 23 and 24 are provided at the rear end of the shoe 21 to be bent and clamped around the rear ends of the sides of shoe 1, to thus secure the wearing shoe in place and against displacement.

The wearing shoe 21 may be made to be riveted, bolted, welded or otherwise secured upon the shoe 1, and is intended to be removed and replaced when worn, thus minimizing wear upon shoe 1.

From the foregoing it will be seen that I have provided a device that will open up a ditch to be of the desired form and will, in passing, accomplish complete and thorough smoothing and troweling of the surface of the ditch to avoid dirt falling or caving back into the ditch. Further, the tool performs two operations in one so that it is not necessary for the farmer to cultivate first and then pass over the same ground with another tool to open and form the ditch, this tool cultivating and making the irrigation ditch at the same time and in a single passage over the field.

While I have herein shown and described only certain specific embodiments of my invention and have suggested only certain possible modifications, it will be appreciated that changes and variations can be made in the form, construction, arrangement, assembly and mounting of the parts, and in the manner of using the same, without departing from the spirit and scope of my invention.

I claim:

1. A ditching shoe for use upon an agricultural implement comprising, an elongated body of substantially V-shaped form in cross section on its lower side and having a rounded blunt point at its forward end to press back the earth in opening a ditch so that the earth will be troweled and packed by passage of the sides of the shoe, and unitary means to smooth the upper side edges of the ditch thus formed.

2. A ditching shoe for use upon an agricultural implement comprising, an elongated body of substantially V-shaped form in cross section on its lower side and having a rounded blunt point at its forward end to press back the earth in opening a ditch so that the earth will be troweled and packed by passage of the sides of the shoe, fins integral with the body portion to smooth the upper side edges and pack the earth on the surface at each side of the ditch thus formed and a mounting post with which said shoe is adjustably associated so that the angle of disposition of the shoe can be varied.

3. A ditching shoe for use upon an agricultural implement comprising, an elongated body of substantially V-shaped form in cross section on its lower side and having a rounded blunt point at its forward end to press back the earth in opening a ditch so that the earth will be troweled and packed by passage of the sides of the shoe, a mounting post with which said shoe is adjustably associated so that the angle of disposition of the shoe can be varied, said mounting post being disposed adjacent to the forward end of the shoe, and a brace adjustably associated with the mounting post and the rear end of the shoe to hold the trailing end of said shoe in position to exert force to press down the earth on the surfaces of the ditch.

4. A cultivating and furrowing tool comprising, an elongated shoe made substantially V-shaped in cross section on its lower side and having its forward end closed as a blunt point to press back the earth in opening a ditch, fins inclined downwardly rearwardly and extending laterally adjacent the forward end of the shoe to smooth down any dirt that may roll up at the top side edges of the ditch, and downwardly inclined laterally extending flared fins at the upper rear edges of the shoe to press down and trowel the surface of the earth on each side of the ditch.

5. A cultivating and furrowing tool comprising, an elongated shoe made substantially V- shaped in cross section on its lower side and having its forward end closed as a blunt point to press back the earth in opening a ditch, fins inclined downwardly rearwardly and extending laterally adjacent the forward end of the shoe to smooth down any dirt that may roll up at the top side edges of the ditch, downwardly inclined laterally extending flared fins at the upper rear edges of the shoe to press down and trowel the surface of the earth on each side of the ditch, and a mounting post adjustably connected with the shoe adjacent to its forward end and extending to be attached to an agricultural implement.

6. A cultivating and furrowing tool comprising, an elongated shoe made substantially V-shaped in cross section on its lower side and having its forward end closed as a blunt point to press back the earth in opening a furrow, fins inclined downwardly rearwardly and extending laterally adjacent the forward end of the shoe to smooth down any dirt that may roll up at the top side edges of the furrow, downwardly inclined laterally extending flared fins at the upper rear edges of the shoe to press down and trowel the surface of the earth on each side of the furrow, a mounting post adjustably connected with the shoe adjacent to its forward end and extending to be attached to an agricultural implement, a cross brace connecting the sides of the shoe adjacent to its rear end, a brace pivotally connected with the mounting post and extending downwardly and rearwardly to overlie the cross brace and provided with an adjacent elongated slotted opening, and a clamp bolt associated with the cross bar and adjustably received in the slotted opening of the brace to hold adjustments of the parts.

7. A cultivating and furrowing tool comprising, an elongated shoe made substantially V-shaped in cross section on its lower side and having its forward end closed as a blunt point to press back the earth in opening a furrow, fins inclined downwardly rearwardly and extending laterally adjacent the forward end of the shoe to smooth down any dirt that may roll up at the top side edges of the furrow, downwardly inclined laterally extending flared fins at the upper rear edges of the shoe to press down and trowel the surface of the earth on each side of the furrow, a mounting post adjustably connected with the shoe adjacent to its forward end and extending to be attached to an agricultural implement, a cross brace connecting the sides of the shoe adjacent to its rear end, a brace pivotally connected with the mounting post and extending downwardly and rearwardly to overlie the cross brace and provided with an adjacent elongated slotted opening, a clamp bolt associated with the cross bar and adjustably received in the slotted opening of the brace to hold adjustments of the parts, said brace bar having an elongated slotted opening in its middle portion, a second mounting post provided with an opening in one of its ends, and a clamp bolt fitted through the slotted opening of the bar and the opening of the second mounting post to adjustably connect the parts together.

JOHN J. CRAWFORD.